Patented May 23, 1944

2,349,733

UNITED STATES PATENT OFFICE 2,349,733

PLASTIC POLYMERIC DERIVATIVES OF CHLOROPRENE AND PROCESS OF PRODUCING THE SAME

Louis H. Howland, Cheshire, Conn., assignor to United States Rubber Company, New York, N. Y., a corporation of New Jersey No Drawing. Application November 6, 1941, Serial No. 418,053

11 Claims. (Cl. 260—36)

The present invention relates to processing of rubber-like masses of polychloroprene known to the trade as neoprene, and more particularly to methods of preparing plastic conversion products of that type of neoprene known as Neoprene GN and similar polychloroprenes, and to the new resulting compositions.

Polymerized chloroprene in various forms is sold under the name of neoprene in a number of types such as E, M, G, GH, I, etc. Neoprene GN, an outstanding material, is understood to be prepared by polymerization of chloroprene in the presence of sulfur. Neoprene I is understood to be prepared by polymerization of chloroprene and a portion of an unsaturated nitrile in the presence of sulfur.

Although ordinary rubber and neoprene have certain properties in common, it is known that they are diverse in their action to many chemicals. For example, benzothiazyl disulfide (Altax) is sold as a vulcanization accelerator for use in natural rubber compounds, whereas it is sold as a retarder of vulcanization for use in neoprene compounds. Also, whereas heat tends to soften rubber, it has a hardening action on neoprene probably due to continued polymerization. Hence, the behaviour of the present chemicals are empirical to neoprene.

Also, while chemicals such as hexamethylene ammonium dithiocarbamate have been used for plasticizing Neoprene GN, it has the disadvantage that it softens the neoprene very quickly during milling, and if the milling has to be extended for a long period of time the mass starts stiffening up again. An object of this invention is to provide chemicals which are substantially free of this fault. Other objects will be apparent from the following description.

The new plasticizers for the elastic polychloroprenes, denoted neoprene, whereby to provide new plastic conversion products thereof having decreased viscosity, have the general formula

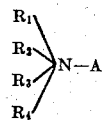

where $R_1$ is an aliphatic hydrocarbon group; $R_2$ is hydrogen or an aliphatic hydrocarbon group; $R_3$ and $R_4$ are each hydrogen or an aliphatic hydrocarbon group; and A is the negative radical of an organic acid (an acidyloxy group). The aliphatic hydrocarbon groups may be each further substituted as in benzylamine, ethanolamine, etc. The organic acid may be monobasic or polybasic. $R_1$ and $R_2$ together, may by having joined aliphatic hydrocarbon radicals, form a ring system, as in piperidine, morpholine, etc.

The compounds may be made by any method known to the art, by neutralizing any of the following amines, or substituted ammonium compounds, with any of the acids listed further below. The chemicals may be in pure or less pure state.

Examples of amines, or substituted ammonium compounds, are: Methylamine, ethylamine, n-propylamine, isopropylamine, allylamine, butylamine, amylamine, octylamine, dodecylamine, ethanolamine, cyclohexylamine, benzylamine, dimethylamine, diethylamine, dipropylamine, diamylamine, dioctylamine, di-dodecylamine, methyl amylamine, ethyl dodecylamine, diallylamine, methyl allylamine, dibenzylamine, diethanolamine, methyl ethanolamine, piperidine, pipecoline, hexamethylene imine, morpholine, decahydroquinoline, di-cyclohexylamine, ethyl cyclohexylamine, trimethylamine, triethylamine, methyl ethyl propylamine, methyl ethyl allylamine, dimethyl dodecylamine, methyl dibenzyl amine, dimethyl benzylamine, dimethyl ethanolamine, triethanolamine, methyl piperidine, ethyl piperidine, ethanol piperidine, dimethyl dibenzyl ammonium hydroxide, trimethyl benzylammonium hydroxide, tetramethyl ammonium hydroxide, etc.

Examples of acids used in the substituted ammonium salts of this invention, and combined with any of the above amines or substituted ammonium compounds are: Formic acid, acetic acid, propionic acid, butyric acid, heptoic acid, lauric acid, stearic acid, lactic acid, chlor acetic acid, phenyl acetic acid, acrylic acid, glycollic acid, succinic acid, maleic acid, phthalic acid, oxalic acid, tartaric acid, citric acid, gluconic acid, salicylic acid, benzoic acid, nitrobenzoic acid, aminobenzoic acid, benzene sulfonic acid, p-toluene sulfonic acid, benzene sulfinic acid, etc.

The milling of the neoprene with the plasticizer should preferably be carried out in the absence of other compounding ingredients that would interfere with the plasticizing action of the chemicals. This last does not apply to other plasticizing agents, amines, dithiocarbamates and tetra alkylthiuram disulfides, mercaptans, and disulfides in general, since they do not interfere with the said plasticizing action.

The chemicals are found to be such powerful plasticizers for neoprene that the neoprene can be markedly softened by mastication in air at ordinary temperatures.

The preferable amounts of the plasticizer for use in the neoprene during the mastication or milling are from 0.2 per cent to 3 per cent by weight based on the neoprene, although smaller or larger amounts may be used if desired. The temperature of milling is the same as that for ordinary milling of Neoprene GN compounds, for example 70–150° F., although the invention is not limited to the temperature of milling. Also, the invention is not limited to the time of standing of the mix, before curing either at room temperature or above, before the mix is used.

The following examples are given in illustration of the invention, parts being by weight:

Example 1

The following mixes were made on a small mill:

| | A | B |
|---|---|---|
| Neoprene GN [1] | 100 | 100 |
| Piperidine salt of acetic acid | | 1.0 |
| $\left(\begin{array}{c} H_3C \diagup \begin{array}{c} CH_2-CH_2 \\ \| \\ CH_2-CH_2 \end{array} \diagdown \begin{array}{c} H \\ \| \\ H \end{array} N-O-\overset{O}{\underset{\|}{C}}-CH_3 \end{array}\right)$ | | |

[1] The Neoprene GN here used has the following chlorine, sulfur, and nitrogen analysis by weight: Cl, 35.80%; N, 0.27%; S, 1.81%.

The chemical was added as soon as the neoprene was working well on the mill. The milling was conducted for 11½ minutes at about 194° F. Total milling time was the same on both A and B. Plasticities were then run on samples of these mixes in the Scott plastometer after 24 hours standing. The plastometer temperature was 212° F. and the plastometer reading was taken on the samples 60 seconds after the start. The test was run by standard procedure. The results were as follows:

| Time of milling | A | B |
|---|---|---|
| 11½ minutes | 571 | 145 |

The figures above are the remaining height in thousandths of an inch in thickness of a sixtenths inch thick sample of the respective mix.

The results plainly show that under the above conditions of processing, the mix B, containing the piperidine salt of acetic acid, has been plasticized considerably more than the mix A containing no added chemical.

Example 2

The following mixes were made:

| | A | B | C | D |
|---|---|---|---|---|
| Neoprene GN | 100 | 100 | 100 | 100 |
| Hexamethylene imine salt of propionic acid | | 1 | | |
| 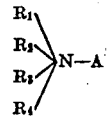 | | | | |
| n-Butyl ammonium propionate | | | | 1 |
| $\left(\begin{array}{c} CH_3-CH_2-CH_2-CH_2 \diagdown \begin{array}{c} H \\ \| \\ H \end{array} \overset{H}{\underset{\|}{N}}-O-\overset{O}{\underset{\|}{C}}-CH_2-CH_3 \end{array}\right)$ | | | | |

Mixing and testing was conducted as under Example 1.

Results are as follows:

| Time of milling | A | B | C | D |
|---|---|---|---|---|
| 14 minutes | 320 | 144 | 410 | 230 |

A divided mill was used for milling and A and B were milled at the same time. Likewise C and D were milled at the same time. The results on B and D as compared to the blanks A and C definitely show a powerful plasticizing action for these two substituted ammonium salts.

When the softened neoprene is compounded in the usual fashion, the resulting compounds vulcanize excellently.

Examples of other chemicals included in the scope of the invention are: Amylammonium acetate, allylammonium heptoate, dodecylammonium benzene sulfonate, ethanolammonium acetate, cyclohexylammonium benzoate, benzylammonium salicylate, diethylammonium oxalate, methylammonium propionate, diethanolammonium acetate, morpholine ammonium laurate, triethylammonium gluconate, triethanolammonium lactate, dimethyl dibenzylammonium acetate, etc.

The invention may be applied to the conversion of many forms of neoprene including solid unvulcanized neoprene, neoprene cements, neoprene dispersions, etc.

The present invention allows of converting elastic polychloroprene and particularly Neoprene GN to a material which can more easily be processed in the factory.

Having thus described my invention, what I claim and desire to protect by Letters Patent is:

1. A process which comprises milling an elastic polychloroprene in the presence of a compound having the general formula $$\begin{array}{c} R_1 \\ R_2 \\ R_3 \\ R_4 \end{array} \!\!\! \diagdown \!\! N-A$$

where $R_1$ is a radical selected from the group consisting of alkyl, hydroxy alkyl, aralkyl, and cyclic alkylene joined with $R_2$; $R_2$ is a radical selected from the group consisting of hydrogen, alkyl, hydroxy alkyl, aralkyl, and cyclic alkylene joined with $R_1$; $R_3$ and $R_4$ represent radicals selected from the group consisting of hydrogen, open-chain aliphatic hydrocarbon radicals, and substituted open-chain aliphatic hydrocarbon radicals; and A is the negative radical of an organic acid selected from the group consisting of carboxylic, sulfinic, and sulfonic acids, neither $R_1$, $R_2$, $R_3$ nor $R_4$ supplying any acidyl radical additional to that supplied by A, for a time and at a temperature sufficient to effect a marked decrease in the resistance to flow of the chloroprene over that which the chloroprene would have if subjected to the same conditions in the absence of said compound, prior to the addition of the usual compounding ingredients.

2. A process which comprises milling a mixture containing an elastic polychloroprene and a polymethylene amine salt of a carboxylic acid.

3. A process which comprises milling a mixture containing an elastic polychloroprene and an open-chain aliphatic amine salt of a carboxylic acid.

4. A process which comprises milling a mixture containing an elastic polychloroprene and a hexamethylene imine salt of propionic acid.

5. A process which comprises milling a mixture containing an elastic polychloroprene and n-butyl ammonium propionate.

6. A process which comprises milling a mixture containing an elastic polychloroprene and a piperidine salt of acetic acid.

7. A process of preparing a plastic conversion product of an elastic polychloroprene which comprises milling same in the presence of air with a compound of the general formula

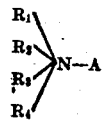

where $R_1$ is a radical selected from the group consisting of alkyl, hydroxy alkyl, aralkyl, and cyclic alkylene joined with $R_2$; $R_2$ is a radical selected from the group consisting of hydrogen, alkyl, hydroxy alkyl, aralkyl, and cyclic alkylene joined with $R_1$; $R_3$ and $R_4$ represent radicals selected from the group consisting of hydrogen, open-chain aliphatic hydrocarbon radicals, and substituted open-chain aliphatic hydrocarbon radicals; and A is the negative radical of an organic acid selected from the group consisting of carboxylic, sulfinic, and sulfonic acids, neither $R_1$, $R_2$, $R_3$ nor $R_4$ supplying any acidyl radical additional to that supplied by A, for a time and at a temperature sufficient to markedly reduce the viscosity of the polychloroprene.

8. A process which comprises milling a mixture containing an elastic polychloroprene and a hexamethylene imine salt of propionic acid for a time and at a temperature sufficient to markedly reduce the viscosity of the polychloroprene.

9. A process which comprises milling a mixture containing an elastic polychloroprene and n-butyl ammonium propionate for a time and at a temperature sufficient to markedly reduce the viscosity of the polychloroprene.

10. A process which comprises milling a mixture containing an elastic polychloroprene and a piperidine salt of acetic acid for a time and at a temperature sufficient to markedly reduce the viscosity of the polychloroprene.

11. Plasticized elastic polychloroprene containing a compound of the general formula

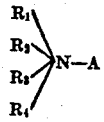

where $R_1$ is a radical selected from the group consisting of alkyl, hydroxy alkyl, aralkyl, and cyclic alkylene joined with $R_2$; $R_2$ is a radical selected from the group consisting of hydrogen, alkyl, hydroxy alkyl, aralkyl, and cyclic alkylene joined with $R_1$; $R_3$ and $R_4$ represent radicals selected from the group consisting of hydrogen, open-chain aliphatic hydrocarbon radicals, and substituted open-chain aliphatic hydrocarbon radicals; and A is the negative radical of an organic acid selected from the group consisting of carboxylic, sulfinic, and sulfonic acids, neither $R_1$, $R_2$, $R_3$ nor $R_4$ supplying any acidyl radical additional to that supplied by A.

LOUIS H. HOWLAND.